HANS W. KOHLER
INVENTOR
By William D. Hall.
ATTORNEY

HANS W. KOHLER
INVENTOR
By: William D. Hall
ATTORNEY

June 27, 1950 H. W. KOHLER 2,512,655

ELECTRICAL APPARATUS

Filed July 19, 1946 4 Sheets-Sheet 3

HANS W. KOHLER, INVENTOR

BY William D. Hall.

HIS ATTORNEY

June 27, 1950 H. W. KOHLER 2,512,655

ELECTRICAL APPARATUS

Filed July 19, 1946 4 Sheets-Sheet 4

HANS W. KOHLER
INVENTOR

By: William D. Hall.
ATTORNEY

Patented June 27, 1950

2,512,655

UNITED STATES PATENT OFFICE 2,512,655

ELECTRICAL APPARATUS

Hans W. Kohler, Washington, D. C.

Application July 19, 1946, Serial No. 684,901

5 Claims. (Cl. 250—152)

(Granted under the act of March 3, 1883, as amended April 30, 1928; 370 O. G. 757)

The invention described herein may be manufactured and used by or for the Government for governmental purposes, without the payment to me of any royalty thereon.

This invention is in electrical apparatus and specifically provides means for converting certain kinds of amplitude modulated signals into frequency modulated signals. The signals in question vary in value at predetermined instants in time which are multiples of a unit time interval apart.

Such signals are used in communications of various types, and, since, when short wave transmission and long distances are involved, it is desirable to use frequency modulation, the problem arises of converting a stepped amplitude modulated signal into a stepped frequency modulated signal.

Two types of amplitude modulated signals are converted into frequency modulated signals according to my invention. In the first type of signal, the amplitudes assume successively a plurality of constant predetermined levels, said levels differing, for example, by integral multiples of a unit level. This is known as a quantized signal. For the second type of amplitude modulated signal, the amplitude assumes successively constant levels, but the levels are not predetermined and do not vary from each other by fixed amounts. Such signals are obtained if a continuously variable signal is sampled instantaneously at a constant rate.

For both types of amplitude modulated signals, the resulting frequency modulated signal is stepped (quantized) and thus is caused to assume predetermined frequencies $f_1$, $f_2$, $f_3$, . . . only. The frequencies change at instants which are multiples of unit time intervals apart.

The principal object of my invention is to provide means and a method for converting a stepped amplitude modulated signal of the nature mentioned into a frequency modulated signal.

Another object is to provide a novel cathode ray tube for quantizing electrical signals.

A further object is to provide certain novel electrode structures for use in cathode ray tube quantizing apparatuses.

Additional objects will be apparent from a reading of the following specification and claims.

Figure 11:
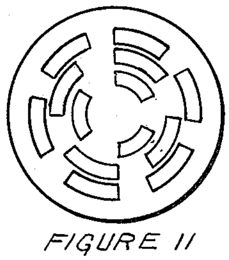
Figure 12:
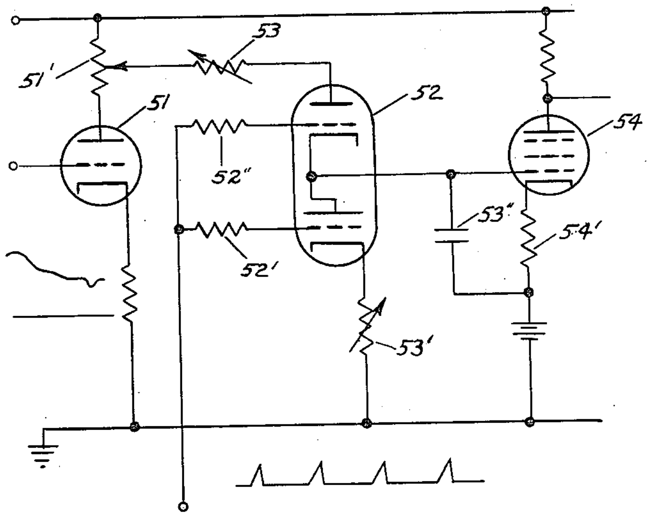

Figures 8, 9, 10, and 11 illustrate modified target arrangements for use in my invention; and Figure 12 is a novel stepping circuit.

Figure 1:
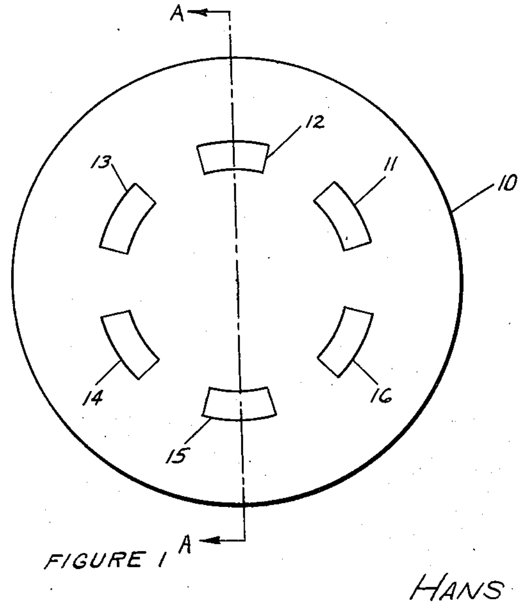
Figure 1 is a view of a cathode ray tube target electrode structure utilized in one embodiment of my invention.
Figure 2:
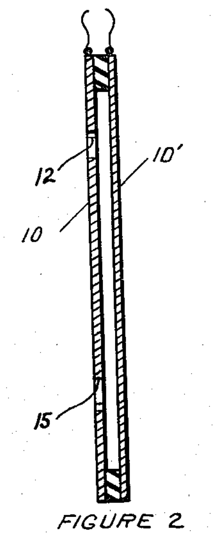
Figure 2 is a section on the line A—A of Figure 1.
Figure 10:
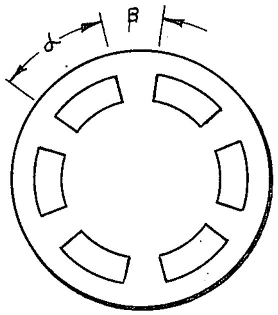

With reference particularly to Figures 1 and 2, 10 represents a member which serves to screen a target electrode proper 10' from a cathode ray beam. The plate is shown with six apertures arranged at regular intervals about its center and at equal distances therefrom. The apertures bear the reference characters 11, 12, 13, 14, 15, and 16. It will be seen that, if a cathode ray beam be rotated so as to travel about plate 10 in the path of apertures 11 through 16, it will at regular intervals impinge upon the target electrode 10' and thus provide, in an ideal case, a one hundred per cent modulated square wave.

Figure 9:
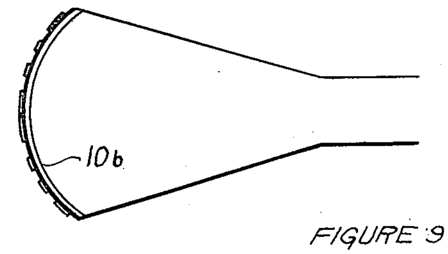

According to the preferred mode of practicing my invention, advantage is taken of the voltage drops produced by a cathode ray beam in circuits associated with two target electrodes arranged as shown in Figure 2 and above described. In another form, member 10' is transparent and adapted to fluoresce under the influence of the cathode ray beam which, of course, impinges upon the plate only when permitted to do so by the openings 11 through 16. In the latter case, 10'' may be a coating on the inside surface of the screen end of the cathode ray tube, and member 10a may be a metal plate with windows located adjacent the screen of the cathode ray tube (see Figure 8, wherein for the purposes of illustration the thickness of the fluorescent coating is much exaggerated). Another method of achieving the same result is to blank out a pattern such as appears in Figure 1 or Figure 3 on the outside of the screen end of the cathode ray tube, the inside surface being coated with fluorescent material, as shown in Figure 9, at 10b. The appearance of the screen of the tube is shown in Figure 11.

In still another embodiment, a window pattern (similar to those of Figures 1 and 3, for example) is painted in fluorescent material on the inside of the tube. The remainder of the screen surface is coated with conductive material and may be grounded to prevent the accumulation of electric charges on the glass surface.

In any case in which fluorescent effects are to be used, the light emitted is focused by a suitable lens system on a photocell or other light sensitive circuit. With a short decay time, a high degree of light modulation can be achieved.

Figure 3:
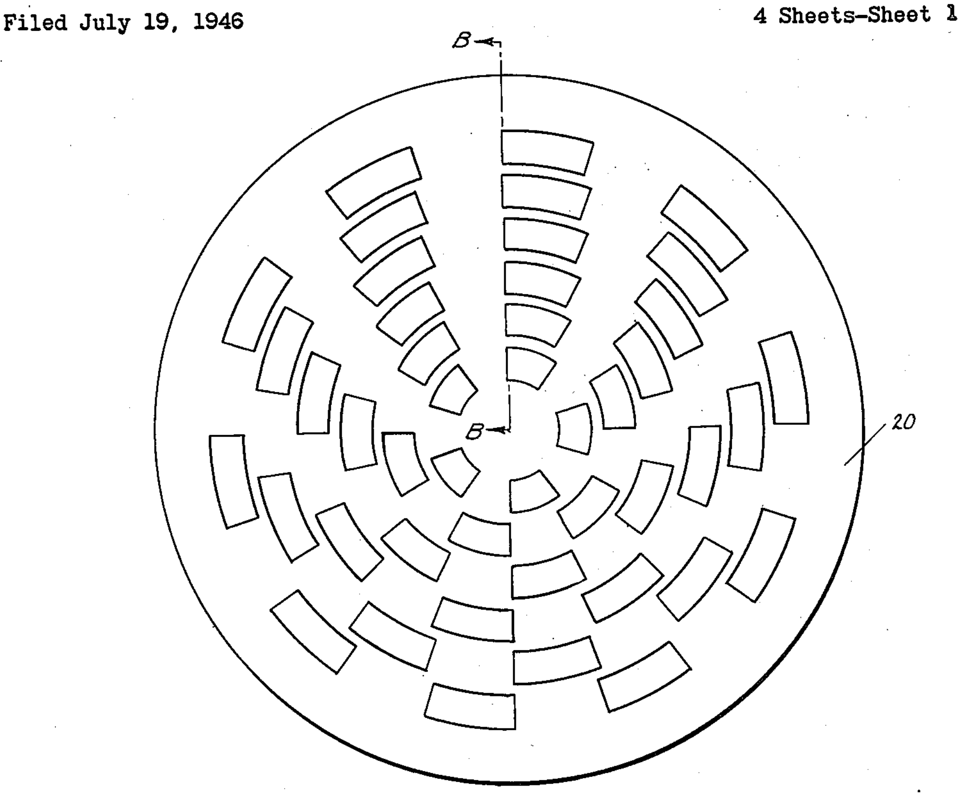
Figure 3 illustrates an electrode structure for a six-level converter according to my invention.

According to Figure 3, six groups of apertures are arranged in concentric circles in electrode 20 which corresponds in function to member 10 of Figure 1. The innermost group contains five apertures while the other rings have six, seven, eight, nine, and ten. As an electron beam travels on a circular path at or near the center line of one of the rings, the current in the punched plate 20 is interrupted a number of times corresponding to the number of windows in its path. At a sweep frequency of 200 cycles per second, for example, there may be obtained a square wave of 1000 cycles, 1200, 1400, 1600, 1800, or 2000 cycles depending upon which row of openings interrupts the beam.

It will be seen that along one radial line (the vertical line B—B of Figure 3) the edges of all windows of the several rings are aligned. In operation, a cathode ray beam is normally permitted to change its orbit only during the interval immediately following the crossing of this line, it being understood that the electron pencil is assumed to be traveling in a counterclockwise direction. Because of this arrangement, successive cycles (of the cathode ray beam) will produce integral predetermined numbers of complete cycles of square waves.

The foregoing description includes the basic features of the invention, but in practice it will be found desirable to provide additional electrodes particularly to prevent undesired distortion of the field within the cathode ray tube and to assist in directing the beam.

Figures 6, 7:
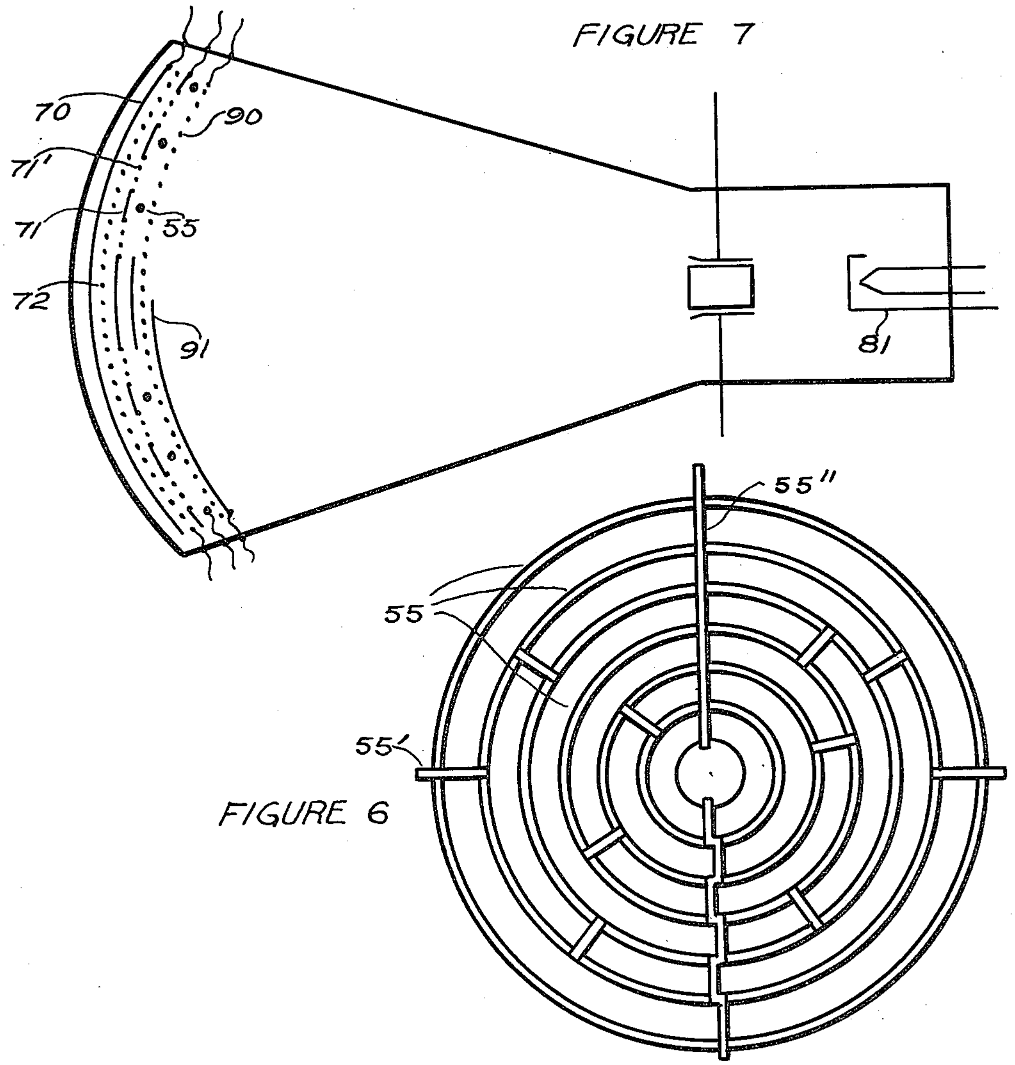
Figure 6 is a directive electrode used in the preferred embodiment of my invention.
Figure 7 is a diagrammatic representation of a complete cathode ray tube converter.
Figure 8:
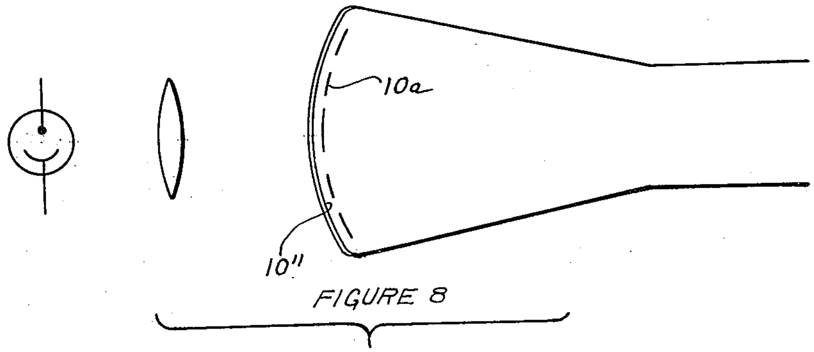

One type of electrode which may be used in this connection is shown in Figure 6; essentially, it comprises seven circular grid members 55 and a plurality of radial bracing and supporting structures 55' and 55''. The purpose of grid members 55 is to keep the electron pencil away from the webs between the several rings of windows. This is achieved by giving the wires a slightly negative potential with respect to the emitting cathode and locating each between a web and the emitter.

The grid structure 55, 55', and 55'' is necessary only when the control voltages which determine the diameters of the electron orbits are derived by sampling an irregularly varying signal, when, in other words, the diameter of a cathode ray beam orbit may be such as to coincide with one of the webs between the rows of windows of Figure 1 or Figure 3. In this case, the negatively charged grids 55 of Figure 6 will cause the electron beam to travel on an adjacent row of windows, the next orbit having either a greater or smaller diameter than the particular web. This property of the tube is called "self-quantizing" since it permits translation of arbitrary levels of amplitude modulated input into quantized levels of frequency modulated output.

Of course, if a quantized amplitude modulated signal is applied to the control circuit of the tube, grid members 55, 55' and 55'' may be dispensed with, the beam orbits in such case automatically being centered in the several rows of windows.

The grid structure of Figure 6 is preferably braced by wires 55' which coincide with the radial edges of the windows. One support wire 55'' may be aligned with line B—B of Figure 3 while other support wires will be irregularly arranged, as shown, so that they do not interfere with the electron beam in the region of the windows.

A number of modifications to the basic structure above described are possible, depending upon circumstances and particularly the type of output desired; thus, the target electrode proper and the masking electrodes may be plane (Figures 1, 2 and 3), spherical (Figure 7), or conic sections. The shapes of the windows or apertures also may be varied as desired, but normally the orifices will be bounded by concentric arcs and two radial lines. The radii of the arcs preferably will be so calculated that $r_2 - r_1$ equals a constant or $$\frac{r_2}{r_1}$$

equals a constant where $r_1$ and $r_2$ are the radii of the inner and outer arcs, respectively. Generally, the angle subtended by the windows of a particular ring equals the angle between adjacent windows of that ring (Figures 1 and 3), this arrangement giving a balanced square wave output consisting of fundamental and odd harmonics. If even harmonics also are desired, the angular length of the windows must be made either larger or smaller than the angle between them ($\alpha \neq \beta$, see Figure 10). As the windows become shorter relative to the spaces between them, the harmonic amplitudes become relatively larger, with a corresponding loss, however, in the output power developed by the tube.

Figures 4, 5:
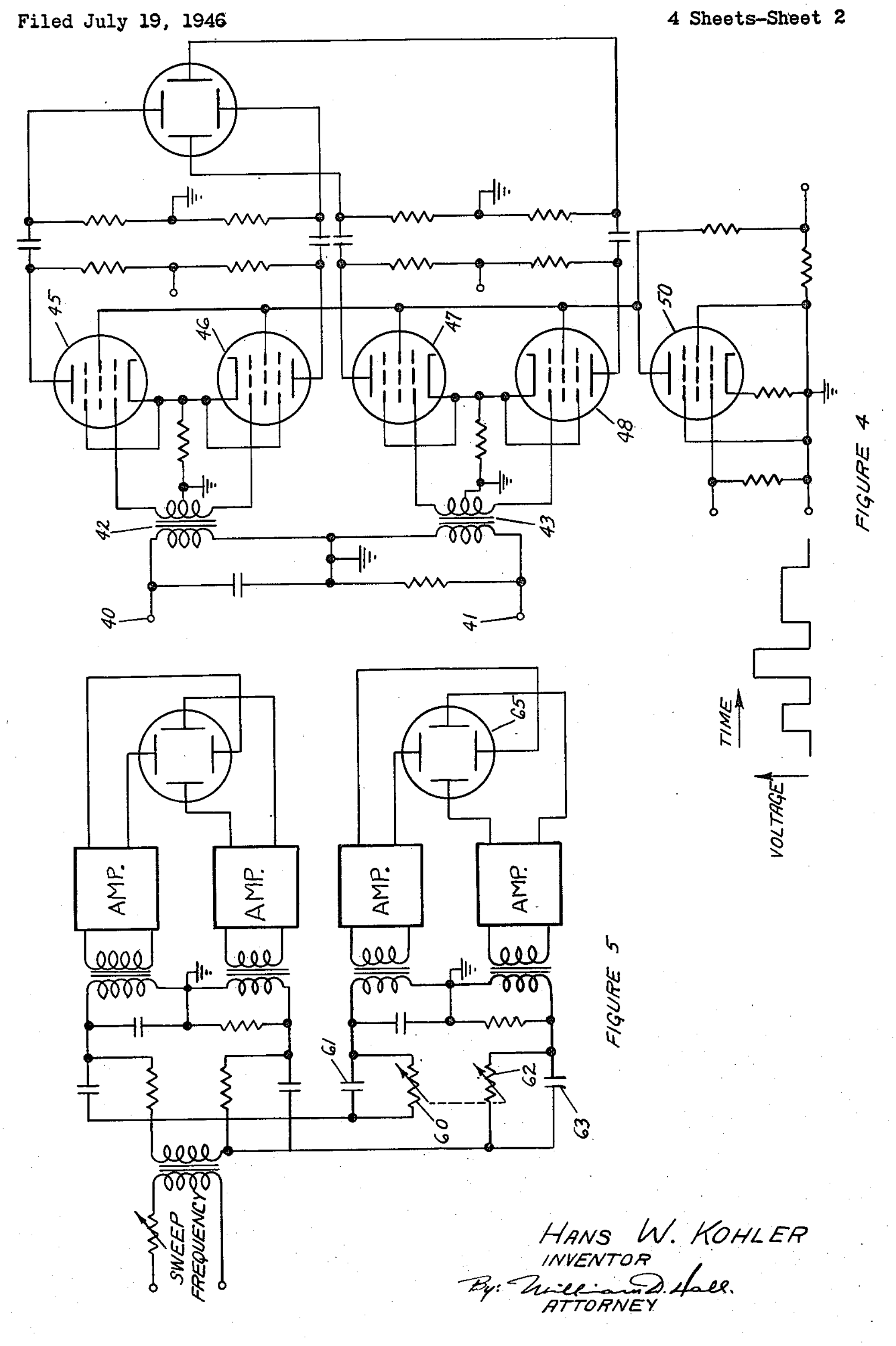
Figure 4 is a diagram of a circuit for controlling the sweep path of the cathode ray beam.
Figure 5 shows a circuit utilizing the principles of my invention and providing means for synchronizing a plurality of cathode ray beams.

The circuit of Figure 4, which will provide control voltages for a circular sweep such as is desired for the cathode ray tube of my invention, is adapted to have a sinusoidal voltage of constant frequency and amplitude applied across terminals 40 and 41. Currents in transformers 42—43 are 90° out of phase relative to each other; the transformer secondaries are connected to push-pull amplifiers 45—46 and 47—48, the outputs of which are controlled by their screen grid potentials. The screens are tied together and connected to the output of a control tube 50, the control grid of the last mentioned tube being fed, in the preferred embodiment of my invention, by a stepped voltage which is in quantized or in arbitrary steps.

Figure 12 shows a circuit which makes it possible to use a continuously varying signal in place of the quantized signal just mentioned which, in other words, converts a signal of varying amplitudes into a stepped signal. According to this circuit, a varying direct current potential is applied to the grid of tube 51 thereby to produce an inverted replica of the input at plate resistor 51'. A portion of the output voltage of tube 51 is applied to tube 52 which comprises two triodes in series.

Positive pulses occurring preferably at regular intervals are fed to the grids of tube 52 through limiting resistors 52'—52'', and said tube, normally nonconducting, conducts during the intervals of the pulses.

The output of tube 52 assumes a potential determined by the potential of resistor 51' at the point of tapping, by the grid limiting resistors of tube 52, and by variable resistors 53—53'. Since all components are constant during operation, the output of tube 52 which charges condenser 53'' bears a direct relationship to the input of the tube 51 during each pulse applied to tube 52. Between pulses, tube 52 is cut off, and the grid-to-cathode potential of tube 54 is determined by the voltage across condenser 53'' and the bias voltage in cathode resistor 54'.

In order to eliminate the switching effect of the tube 52 on the operation of tube 51, the values of variable resistors 53—53' should be large as compared with plate resistor 51' of tube 51.

The output potential of tube 51 is a stepped signal and is used as has already been described to control the circuit of Figure 4.

Figure 5 illustrates a means for synchronizing two cathode ray tubes operating in accordance with my invention. By an obvious extension of this circuit, additional cathode ray tubes may be synchronized. According to the drawing, the parallel resistor-condenser circuits 60—61 and 62—63 allow a variable phase shift to be applied to cathode ray tube 65, the variation, of course, being achieved by varying the ganged resistors 60 and 62. The remainder of the circuit is similar to that illustrated in Figure 4 and will not be described in detail.

Figure 7 shows an arrangement of target and directive electrodes such as are used according to the preferred mode of practicing my invention. The figure is a diagrammatic showing and not a true section through my novel cathode ray tube. The beam forming, focusing, and deflecting means are conventional and are not illustrated in detail. In Figure 7 may be seen a curved target electrode proper 70 adjacent the forward end of the tube. Between target 70 and the masking plate or secondary target electrode 71 is a grid 72 (constructed in any convenient fashion) which serves as a suppressor to prevent secondary emission from target 70 from interfering with proper operation of the tube.

Adjacent masking device 71 and between it and the electron source is the concentric self-quantizing grid structure 55—55' of Figure 6. This structure is intended to be maintained somewhat negative with respect to the cathode of the tube and serves, as described, to repel an electron beam from the areas between the several rows of apertures and thus to center it within the paths of the apertures. If quantized amplitude modulated signals are used, grid structure 55—55' may be omitted.

Between structure 55 and cathode 81 is a further grid 90. This grid is conventional and serves principally to make more uniform the field within the tube adjacent the punched plate. Commonly, it will be maintained at potential higher than that of the cathode of the tube. A still further grid 71' which serves a purpose similar to that of grid 90 may be seen adjacent the perforated plate 70; preferably, although not necessarily, this grid includes radially extending wires, some of which are aligned with and/or welded direct to the edges of the apertures in the plate.

A further electrode 91 involves a single wire extending from the effective outer extremity of the tube to approximately the center thereof. This member is adapted to provide an impulse to a switching circuit each time a cathode ray beam impinges upon it and in a structure like that of Figure 3 will normally be aligned with the line B—B.

The invention may be used in various ways. Suppose, for example, a frequency diversity system is desired having two mark frequencies of 1000 and 2000 cycles and space frequencies of 1500 and 2500 cycles per second, respectively. One means for achieving this result is to use two cathode ray tubes synchronized (as with the circuit of Figure 5). One tube will have a perforated plate with a row of four apertures therein and a row of six apertures therein. With a sweep frequency of 250 cycles per second, there will thus be generated two signals of 1000 and 1500 cycles per second. In the second tube (the same sweep frequency being employed), the perforated plate has a row of eight apertures and a row of ten apertures. In both cases, the apertures of the rows are separated by distances equal to aperture length so that balanced outputs are obtained.

Another way of reaching the desired result is to employ a single cathode ray tube with a perforated plate providing an unbalanced output, with spacing between the apertures in other words greater or less than the lengths of the openings. If the frequency remains at 250 cycles per second, a ring of two apertures will produce a 500 cycle fundamental; the third and fifth harmonics are utilized. Another row of four openings in the perforated plate will give a fundamental of 1000 cycles; the fundamental and the second harmonic are utilized.

The foregoing description is in specific terms, and many modifications will suggest themselves within the spirit of the invention. For the true scope of my invention, therefore, reference should be had to the appended claims.

I claim:

1. In a cathode ray tube having a source of electrons and means for focusing the same into a beam, a target electrode and a masking device between said electrode and said source and adjacent the former but electrically distinct therefrom said masking device being provided with concentric rows of apertures, means for repelling said beam from the areas between said concentric rows of apertures, and means for selectively sweeping said rows with said beam.

2. In a cathode ray tube having a source of electrons and means for focusing the same into a beam, a target electrode and a masking device between said electrodes and said source and adjacent the former but electrically distinct therefrom said masking device being provided with concentric rows of apertures bounded in part by a radial edge, the said edges of the apertures of the several rows being in radial alignment at at least one point, means for selectively sweeping said rows with said beam, and an electrical conductor located between said source and said masking device and aligned with said aligned edges of said apertures so as to be swept by said beam substantially simultaneously with the crossing thereby of any one of said aligned edges.

3. In a cathode ray tube of the nature described having a source of electrons therein, a target structure including a masking device with concentric rows of apertures therein, a grid comprising concentric conductors located between said source and said masking device the said conductors being adapted to repel electrons from those portions of said masking device which lie between said concentric rows of apertures, and a further grid structure adapted to make substantially uniform the field within said tube.

4. In a cathode ray tube of the nature described having a source of electrons therein, a target structure including a masking device with concentric rows of apertures therein and a grid adapted to repel electrons from those portions of said masking device which lie between said concentric rows of apertures.

5. In a cathode ray tube having a source of electrons and means for focusing the same into a beam, a target electrode and a masking device between said electrode and said source and adjacent the former but electrically distinct therefrom said masking device being provided with concentric rows of apertures the size of the apertures in a row differing from the spacing between the apertures in said row by a predetermined amount, means for repelling said beam from those portions of said masking device which lie between said concentric rows, and means for selectively sweeping said rows with said beam.

HANS W. KOHLER.

REFERENCES CITED

The following references are of record in the file of this patent:

UNITED STATES PATENTS

| Number | Name | Date |
| --- | --- | --- |
| 2,086,904 | Evans | July 13, 1937 |
| 2,173,193 | Zworykin | Sept. 19, 1939 |
| 2,246,283 | Zworykin | June 17, 1941 |
| 2,324,314 | Michel | July 13, 1943 |
| 2,396,395 | Smith et al. | Mar. 12, 1946 |